(12) United States Patent
Nakagawa et al.

(10) Patent No.: US 9,045,003 B2
(45) Date of Patent: Jun. 2, 2015

(54) PNEUMATIC TIRE

(75) Inventors: Ryuji Nakagawa, Tokyo (JP); Horihisa Kano, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 246 days.

(21) Appl. No.: 13/142,226

(22) PCT Filed: Dec. 28, 2009

(86) PCT No.: PCT/JP2009/071796
§ 371 (c)(1),
(2), (4) Date: Aug. 15, 2011

(87) PCT Pub. No.: WO2010/074286
PCT Pub. Date: Jul. 1, 2010

(65) Prior Publication Data
US 2011/0290396 A1    Dec. 1, 2011

(30) Foreign Application Priority Data
Dec. 26, 2008 (JP) ................................ 2008-335143
Jun. 29, 2009 (JP) ................................ 2009-154217

(51) Int. Cl.
*B60C 5/00* (2006.01)
*B60C 1/00* (2006.01)
(Continued)

(52) U.S. Cl.
CPC ............ *B60C 1/00* (2013.01); *Y10T 152/10495* (2015.01); *B60C 1/0008* (2013.04);
(Continued)

(58) Field of Classification Search
CPC .......... B60C 1/00; B60C 1/0008; B60C 5/14; B60C 19/44; B60C 2001/0033; C08K 3/0033; C08K 3/04; C08L 15/00; C08L 7/00
USPC ......................................................... 524/495
See application file for complete search history.

(56) References Cited

U.S. PATENT DOCUMENTS

2002/0056495 A1    5/2002   Hiruma
2004/0254301 A1    12/2004  Tsukimawashi et al.
(Continued)

FOREIGN PATENT DOCUMENTS

EP      1 859 964 A1    11/2007
JP      2002-103925 A   4/2002
(Continued)

OTHER PUBLICATIONS

JP 2004-249873 A (2004), Machine translation, JPO Advanced Industrial Property Network (AIPN).*
(Continued)

*Primary Examiner* — Susannah Chung
*Assistant Examiner* — Josephine Chang
(74) *Attorney, Agent, or Firm* — Sughrue Mion, PLLC (57) ABSTRACT

Provided is a pneumatic tire which is improved in a rolling resistance and a ride comfort in normal running without damaging a run flat durability.

It is a pneumatic tire provided with a bead core, a carcass layer, a tread rubber layer, an inner liner, a side reinforcing layer and a bead filler, characterized by using a rubber composition (a) which contains (A) a rubber component and (B) a filler and which has a dynamic storage modulus (E') of 10 MPa or less at a dynamic strain of 1% and 25° C. and a Σ value of 5.0 or less in a loss tangent tan δ at 28 to 150° C. in the physical properties of the vulcanized rubber.

13 Claims, 3 Drawing Sheets

(51) Int. Cl.
*B60C 5/14* (2006.01)
*C08C 19/44* (2006.01)
*C08K 3/00* (2006.01)
*C08L 15/00* (2006.01)
*B60C 17/00* (2006.01)
*C08K 3/04* (2006.01)

(52) U.S. Cl.
CPC .............. *B60C 5/14* (2013.01); *C08C 19/44* (2013.01); *C08K 3/0033* (2013.01); *C08K 3/04* (2013.01); *C08L 15/00* (2013.01); *B60C 2001/0033* (2013.04); *B60C 2017/0063* (2013.04); *B60C 17/0009* (2013.04)

(56) References Cited

U.S. PATENT DOCUMENTS

| | | |
|---|---|---|
| 2005/0137314 A1 | 6/2005 | Spadone |
| 2009/0288751 A1 | 11/2009 | Yokokura et al. |

FOREIGN PATENT DOCUMENTS

| | | | | |
|---|---|---|---|---|
| JP | 2003-171418 A | | 6/2003 | |
| JP | 2003171418 A | * | 6/2003 | |
| JP | 2004-249873 A | | 9/2004 | |
| JP | 2004249873 A | * | 9/2004 | ............ B60C 17/00 |
| JP | 2004276699 A | * | 10/2004 | ............ B60C 5/14 |
| JP | 2005-178767 A | | 7/2005 | |
| JP | 2005178767 A | * | 7/2005 | ............ B60C 5/14 |
| JP | 2007-331422 A | | 12/2007 | |
| JP | 2009-29404 A | | 2/2009 | |
| JP | 2009029404 A | * | 2/2009 | |
| WO | WO 2006047328 A1 | * | 5/2006 | |
| WO | 2008/010531 A1 | | 1/2008 | |

OTHER PUBLICATIONS

JP 2004-276699 A (2004), Machine translation, JPO Advanced Industrial Property Network (AIPN).*
JP 2005-178767 A (2005), Machine translation, JPO Advanced Industrial Property Network (AIPN).*
JP 2009-029404 A (2009), Machine translation, JPO Advanced Industrial Property Network (AIPN).*
Jp 2003-171418 A (2003), Machine translation, JPO Advanced Industrial Property Network (AIPN).*
Twombly,"Dynamic Mechanical Analysis Theory of Operation," ANTEC 1996 Plastics: Plastics—Racing into the Future, vol. 3: Special Areas. Society of Plastics Engineers, pp. 3676-3678 (1996).*
International Search Report of PCT/JP2009/071796 dated Jan. 26, 2010.
Extended European Search Report issued in European Application No. 09835079.6 dated Aug. 20, 2012.

* cited by examiner

Fig. 3 temperature

PNEUMATIC TIRE

CROSS REFERENCE TO RELATED APPLICATIONS

This application is a National Stage of International Application No. PCT/JP2009/071796 filed Dec. 28, 2009, claiming priority based on Japanese Patent Application Nos. 2008-335143, filed Dec. 26, 2008, and 2009-154217, filed Jun. 29, 2009, the contents of all of which are incorporated herein by reference in their entirety.

BACKGROUND OF THE INVENTION

The present invention relates to a pneumatic tire improved in a rolling resistance and a ride comfort in normal running without damaging a run flat durability, wherein a rubber composition having a dynamic storage modulus (E') of a certain value or less and a Σ value of a certain value or less in a loss tangent tan δ at 28 to 150° C. in the characteristics of the vulcanized rubber is used particularly for a side reinforcing layer and/or a bead filler, and a rubber composition in which an air permeability coefficient at 60° C. is a certain value or lower is used for an inner liner.

RELATED ART

Run flat tires of a side reinforcing type in which a cross-sectionally lunate side reinforcing rubber layer is disposed at an innermost side of a carcass in a side wall part of the tire to enhance a rigidity of the side wall part have so far been known as a tire capable of running safely in a distance of a certain extent even in a state in which an inner pressure of the tire is reduced by blowout and the like, a so-called run flat tire (refer to patent documents 1 and 2).

In pneumatic tires, a side wall part and a bead filler of the tires are deformed to a large extent in a state of running when an inner pressure of the tires is reduced by blowout and the like, so-called run flat running, and heat generation is expedited and reaches 200° C. or higher in a certain case. In the above state, even a pneumatic tire provided with a side reinforcing layer exceeds the breaking limits of the side reinforcing layer and the bead filler and comes to have troubles.

Means for extending time spent until the above troubles are caused include a method in which a rubber composition used for a side reinforcing layer and a bead filler is blended with a large amount of sulfur to be provided with a high elasticity to thereby inhibit a deformation amount of the side wall part and the bead filler of the tire. However, the problem that the tire is elevated in a rolling resistance in normal running and reduced in a low fuel consumption is involved therein.

In contrast with this, it is proposed in a patent document 3 that a rubber composition containing various modified conjugate diene-aromatic vinyl copolymers, a heat resistance improving agent and the like is used for a side reinforcing layer and a bead filler.

Further, it is proposed in a patent document 4 that a rubber composition containing a specific conjugate diene based polymer and a phenol based resin is used for a side reinforcing layer and a bead filler.

All of them have a purpose of enhancing an elastic modulus of the rubber compositions used for a side reinforcing layer and a bead filler and inhibiting a reduction in the elastic modulus at high temperatures, and an improvement in the run flat resistance to large extent is obtained, but the rolling resistance in normal running is notably deteriorated.

On the other hand, means for extending time spent until the troubles described above are caused include increasing a volume of the rubber such as increasing a maximum thickness of a mounted side reinforcing layer and a mounted bead filler, but when the above method is employed, unfavorable situations such as deterioration of the ride comfort in normal running, an increase in the weight and an increase in the noise level are brought about.

If a mounted side reinforcing layer and a mounted bead filler are reduced in a volume in order to avoid the situations described above, for example, deterioration of the ride comfort, the problems that a load in run flat can not be supported to deform a side wall part of the tire to a large extent in run flat and that an increase in heat of the rubber composition is brought about to result in allowing the tire to come to cause troubles earlier have been involved therein.

Further, when the rubber used is reduced in an elasticity by changing the materials blended, it is the existing situation that a load in run flat can not be supported as well to deform a side wall part of the tire to a large extent and that an increase in heat of the rubber composition is brought about to result in allowing the tire to come to cause troubles earlier.

The run flat tires of a side reinforcing type described above are thicker in a gauge of a side part than conventional tires, and therefore a rubber composition having a fast vulcanization speed is applied to the side reinforcing rubber layer to inhibit the productivity from being reduced. However, if a vulcanization speed of the rubber composition for the side reinforcing rubber layer is accelerated, a difference in a vulcanization speed from an inner liner adjacent to the above side reinforcing rubber layer is increased, and a co-vulcanization property of the side reinforcing rubber layer and the inner liner is reduced. As a result thereof, the side reinforcing rubber layer is readily peeled off from the inner liner in running in a state in which the tire is reduced in an inner pressure by blowout and the like (hereinafter referred to as run flat running), and a problem has been involved in the run flat durability.

In contrast with this, a blend of butyl rubber and natural rubber is usually used as a rubber component of a rubber composition for an inner liner in order to inhibit a side reinforcing rubber layer from being peeled off from an inner liner. In the above case, a vulcanization speed of the inner liner can relatively be accelerated, but the problems that the inner liner is reduced in an air non-permeability and that the respective members of the tire are changed in physical properties with the passage of time to a large extent or the belt is reduced in a durability have been involved therein.

Patent document 1: Japanese Patent Application Laid-Open No. 310019/1999
Patent document 2: Japanese Patent Application Laid-Open No. 103925/2002
Patent document 3: WO02/02356
Patent document 4: Japanese Patent Application Laid-Open No. 74960/2004

DISCLOSURE OF THE INVENTION

Under the situation described above, an object of the present invention is to provide a pneumatic tire which is improved in a rolling resistance and a ride comfort in normal running without damaging a run flat durability.

Intense researches repeated by the present inventors in order to develop a pneumatic tire having the preferred properties described above have resulted in finding that a pneumatic tire prepared by using a rubber composition having a dynamic storage modulus (E') of a certain value or less and a Σ value of a certain value or less in a loss tangent tan δ at 28 to 150° C. in the physical properties of the vulcanized rubber particularly for a side reinforcing layer and/or a bead filler and applying a rubber composition having a specific air permeability coefficient to an inner liner can be fit to the object described above. The present invention has been completed based on the above knowledge.

That is, the present invention provides:

[1] A pneumatic tire provided with a bead core, a carcass layer, a tread rubber layer, an inner liner, a side reinforcing layer and a bead filler, characterized by using a rubber composition (a) which contains (A) a rubber component and (B) a filler and which has a dynamic storage modulus (E') of 10 MPa or less at a dynamic strain of 1% and 25° C. and a Σ value of 5.0 or less in a loss tangent tan δ at 28 to 150° C. in the physical properties of the vulcanized rubber.

[2] The pneumatic tire according to the above item [1], wherein a rubber composition (b) in which an air permeability coefficient at 60° C. is $6.0\times10^{-10}$ cm³·cm/cm²·sec·cm Hg or less is used for the inner liner.

[3] The pneumatic tire according to the above item [1], wherein 50 parts by mass or less of the filler (B) is contained based on 100 parts by mass of the rubber component (A).

[4] The pneumatic tire according to the above item [1] or [3], wherein in the rubber composition (a), the filler (B) is at least one selected from carbon black, silica and an inorganic filler represented by Formula (I):

$$nM \cdot xSiO_y \cdot zH_2O \qquad (I)$$

wherein M is at least one selected from metal selected from aluminum, magnesium, titanium, calcium and zirconium, oxides or hydroxides of the above metals, hydrates thereof and carbonates of the metals described above, and n, x, y and z are an integer of 1 to 5, an integer of 0 to 10, an integer of 2 to 5 and an integer of 0 to 10 respectively.

[5] The pneumatic tire according to the above item [1], [3] or [4], wherein the filler (B) is carbon black.

[6] The pneumatic tire according to the above item [5], wherein the carbon black is at least one selected from an FEF grade, a GPF grade, an HAF grade, an ISAF grade and an SAF grade.

[7] The pneumatic tire according to the above item [6], wherein the carbon black is the FEF grade.

[8] The pneumatic tire according to any of the above items [1] and [3] to [7], wherein in the rubber composition (a), the rubber component (A) contains a modified conjugate diene based polymer.

[9] The pneumatic tire according to the above item [8], wherein the modified conjugate diene based polymer is an amine-modified conjugate diene based polymer.

[10] The pneumatic tire according to the above item [9], wherein the amine-modified conjugate diene based polymer is a protic amine-modified conjugate diene based polymer.

[11] The pneumatic tire according to the above item [9] or [10], wherein the amine-modified conjugate diene based polymer is a primary amine-modified conjugate diene based polymer.

[12] The pneumatic tire according to the above item [11], wherein the primary amine-modified conjugate diene based polymer is a polymer obtained by reacting an active end of a conjugate diene based polymer with a protected primary amine compound.

[13] The pneumatic tire according to the above item [12], wherein the conjugate diene based polymer is a polymer obtained by subjecting a conjugate diene compound alone or a conjugate diene compound and an aromatic vinyl compound to anionic polymerization in an organic solvent using an organic alkali metal compound as an initiator.

[14] The pneumatic tire according to the above item [13], wherein the conjugate diene based polymer is polybutadiene.

[15] The pneumatic tire according to any of the above items [12] to [14], wherein the protected primary amine compound is N,N-bis(trimethylsilyl)aminopropyltriethoxysilane.

[16] The pneumatic tire according to any of the above items [1] and [3] to [15], wherein the rubber composition (a) is used for the side reinforcing layer.

[17] The pneumatic tire according to any of the above items [1] and [3] to [15], wherein the rubber composition (a) is used for the bead filler.

[18] The pneumatic tire according to any of the above items [1] and [3] to [15], wherein the rubber composition (a) is used for the side reinforcing layer and the bead filler.

[19] The pneumatic tire according to the above item [2], wherein the rubber composition (b) for the inner liner contains butyl rubber as the rubber component.

[20] The pneumatic tire according to the above item [19], wherein in the rubber composition (b) for the inner liner, a content of the butyl rubber in the rubber component is 80% by mass or more.

[21] The pneumatic tire according to any of the above items [1] to [20], wherein the rubber composition (b) for the inner liner is blended with 15 parts by mass or more of an inorganic filler having an aspect ratio of 5 to 30 based on 100 parts by mass of the rubber component.

[22] The pneumatic tire according to any of the above items [1] to [21], wherein a vulcanization speed difference represented by the following Formula (II) between the rubber composition (a) used for the side reinforcing rubber layer and the rubber composition (b) used for the inner liner is 13.5 or less at a vulcanization temperature of 160° C.:

$$\Delta=|\{Tc(90)-Tc(10)\}_I-\{Tc(90)-Tc(10)\}_S| \qquad (II)$$

wherein Tc(90) is 90% vulcanization time (minute) of a rubber composition; Tc(10) is 10% vulcanization time (minute) of a rubber composition; I is the rubber composition for the inner liner; and S is the rubber composition for the side reinforcing rubber layer.

[23] The pneumatic tire according to any of the above items [1] to [22], wherein a peeling stress between the side reinforcing rubber layer and the inner liner is 5.5 kgf/inch or more.

According to the present invention, (1) a dynamic storage modulus (E') at a dynamic strain of 1% and 25° C. is controlled to 1 to 10 MPa, preferably 3 to 10 MPa and more preferably 3 to 8 MPa in the vulcanized rubber physical properties by reducing (preferably 50 parts by mass or less) a content of the filler (particularly carbon black) contained in the rubber composition, whereby the side rigidity can be softened to enhance the ride comfort in normal running.

Also, heat generation can be reduced by reducing a content of the filler.

(2) Further, using the modified conjugate diene based polymer (an amine-modified, particularly primary amine-modified conjugate diene based polymer) as the rubber component makes it possible to enhance a dispersibility of carbon black and inhibit heat generation and makes it possible to control a Σ value of a loss tangent tan δ at 28 to 150° C. to 1.0 to 5.0, preferably 2.0 to 4.0.

(3) As described above, a temperature of a vulcanized rubber is elevated by run flat running. As the temperature is elevated, the mechanical characteristics (rupture stress, rupture elongation and the like) thereof are reduced to a large extent, and the rubber results in being broken. However, the rubber composition used for the tire of the present invention can inhibit heat generation in run flat running to a large extent by the effects of the items (1) and (2) described above, and therefore a gauge of the reinforcing rubber layer can be reduced in a thickness. Even if the gauge is reduced in a thickness, the run flat property can be secured, and the low fuel consumption is enhanced, as well by further reduction in the heat generation as well as a reduction in the weight. A gauge of the reinforcing rubber layer is set to a maximum thickness part of the reinforcing rubber layer, and a gauge of the above reinforcing rubber layer falls in a range of preferably 4 to 12 mm, more preferably 5 to 10 mm.

(4) Further, though not an essential requisite, the rubber composition in which an air permeability coefficient at 60° C. is $6.0 \times 10^{-10}$ cm$^3$·cm/cm$^2$·sec·cm Hg or less is applied to the inner liner, and therefore the air non-permeability is maintained as compared with ever before. As a result thereof, an inner pressure holding property of the tire is enhanced further more, and the tire members are surely inhibited from being deteriorated with the passage of time.

(5) Further, though not an essential requisite as well, a vulcanization speed difference Δ represented by Formula (II) between the rubber composition (a) for the side reinforcing rubber layer and the rubber composition (b) for the inner liner is preferably 13.5 or less at a vulcanization temperature of 160° C. As a result thereof, a co-vulcanization property of the side reinforcing rubber layer and the inner liner is enhanced, whereby a peeling stress between the side reinforcing rubber layer and the inner liner is elevated in run flat running to inhibit both from being peeled off, and a run flat durability of the tire is enhanced.

As described above, according to the effects of (1) to (5), using the rubber composition (a) particularly for the side reinforcing rubber layer and/or the bead filler and using the rubber composition (b) for the inner liner make it possible to provide a pneumatic tire in which a side reinforcing rubber layer is inhibited from being peeled off from an inner liner while maintaining an air non-permeability of the inner liner to enhance a run flat durability thereof and in which a rolling resistance and a ride comfort in normal running are improved.

EXPLANATIONS OF THE CODES 1, 1' Bead cores
2 Carcass layer
2a Turnup carcass ply
2b Down carcass ply
3 Side rubber layer
4 Tread rubber layer
5 Belt layer
6 Inner liner
7 Bead filler
8 Side reinforcing layer
10 Shoulder zone

BEST MODE FOR CARRYING OUT THE INVENTION

Pneumatic Tire

Figure 1:
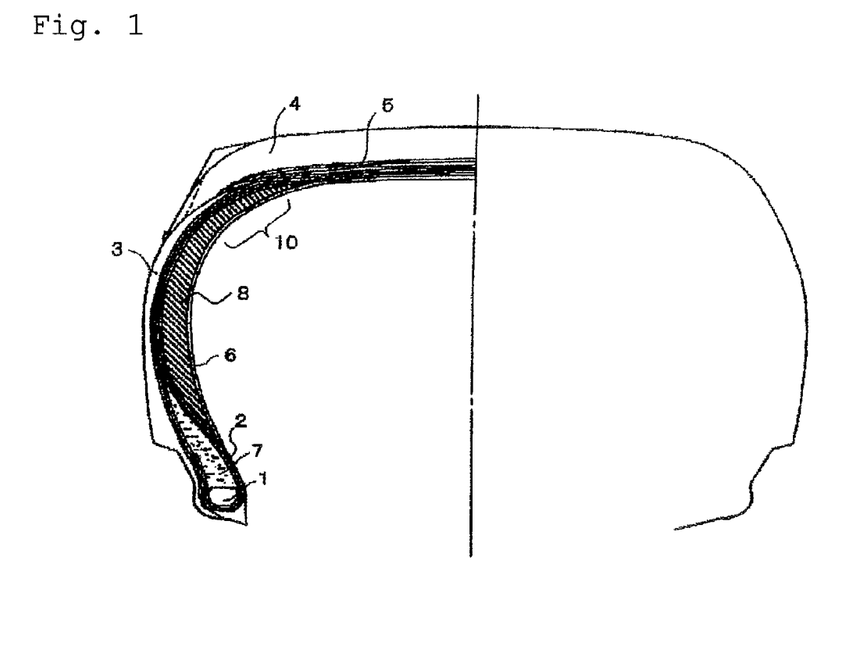
FIG. 1 is a schematic drawing showing a cross section in one embodiment of the pneumatic tire of the present invention.

First, the pneumatic tire of the present invention shall be explained below with reference to the drawings. FIG. 1 is a schematic drawing showing a cross section in one embodiment of the pneumatic tire of the present invention.

In FIG. 1, a suited embodiment of the pneumatic tire of the present invention is a pneumatic tire provided with a carcass layer 2 which is ranged toroidally over a space between a pair of bead cores 1, 1' (1' is not illustrated) and which comprises at least one radial carcass ply rolling up the above bead core 1 from an inside of the tire to an outside thereof at both end parts, a side rubber layer 3 which is arranged at an outside of a tire axial direction in a side region of the above carcass layer 2 to form an outside part, a tread rubber layer 4 which is arranged at an outside of a tire diameter direction in a crown region of the above carcass layer 2 to form a grounding part, a belt layer 5 which is arranged between the above tread rubber layer 4 and the crown region of the above carcass layer 2 to form a reinforcing belt, an inner liner 6 which is arranged on a whole surface of the carcass layer 2 at an inside of the tire to form an air proof film, a bead filler 7 which is arranged between a main body part of the carcass layer 2 extending from one bead core 1 to the other bead core 1' and a roll-up part rolled up on the above bead core 1 and at least one side reinforcing layer 8 which is arranged between the carcass layer 2 and the inner liner 6 from a bead filler 7 side part to a shoulder zone 10 in a side region of the above carcass layer and in which a cross-sectional form along a rotational axis of the tire is approximately lunate.

Further, in the tire shown in the drawing (FIG. 2), the radial carcass 2 comprises a turnup carcass ply 2a and a down carcass ply 2b, and the both end parts of the turnup carcass ply 2a are turned down around the bead core 1 to form turnup end parts. The structure and the ply number of the radial carcass 2 shall not be restricted thereto.

In the pneumatic tire of the present invention, the rubber composition (a) which has a dynamic storage modulus (E') of 10 MPa or less at a dynamic strain of 1% and 25° C. and a Σ value of 5.0 or less in a loss tangent tan δ at 28 to 150° C. in vulcanized rubber physical properties described later in detail is used particularly for the side reinforcing rubber layer 8 and/or the bead filler 7 each described above, and the rubber composition (b) having a specific air permeability coefficient is applied, if necessary, to the inner liner 6; the side reinforcing rubber layer is inhibited from being peeled off from the inner liner while maintaining an air non-permeability by setting a peeling stress between the inner liner 6 and the side reinforcing layer 8 to the range described above, whereby the run flat durability can be enhanced, and the rolling resistance and the ride comfort in normal running can be improved.

Rubber Composition (a):

In the pneumatic tire of the present invention described above, the rubber composition which contains the rubber component (A) and the filler (B) and which has a dynamic storage modulus (E') of 10 MPa or less at a dynamic strain of 1% and 25° C. and a Σ value of 5.0 or less in a loss tangent tan δ at 28 to 150° C. in the physical properties of the vulcanized rubber can be used for the side reinforcing layer 8 and/or the bead filler 7.

Rubber Component (A):

A modified conjugate diene based polymer obtained by modifying a conjugate diene based polymer is used as the rubber component (A) in the rubber composition according to the present invention, and particularly the rubber component containing an amine-modified conjugate diene based polymer can preferably be used. The rubber component containing the above modified conjugate diene based polymer in a proportion of 30% by mass or more, preferably 50% by mass or more can be used. Containing 30% by mass or more of the modified conjugate diene based polymer in the rubber component makes it possible to reduce heat generation of the rubber composition and decrease a thickness of a gauge of the reinforcing rubber and makes it possible to provide a pneumatic tire improved in a ride comfort in normal running without damaging a run flat durability.

The above modified conjugate diene based polymer contains at least one of a tin atom, a nitrogen atom and a silicon atom as a functional group for modification in a molecule.

The above compound containing at least one tin atom in a molecule includes preferably tin tetrachloride, tributyltin chloride, dioctyltin dichloride, dibutyltin dichloride and triphenyltin chloride.

The above compound containing at least one nitrogen atom in a molecule includes isocyanate compounds, aminobenzophenone compounds, urea derivatives, 4-dimethylaminobenzylideneaniline, dimethylimidazolidinone, N-methylpyrrolidone and the like.

The modified conjugate diene based polymer is preferably an amine-modified conjugate diene based polymer, and it is preferably a polymer into which a protic amine group and/or an amine group protected by a releasable group as an amine based functional group are introduced in a molecule as the functional group for modification. It includes preferably polymers into which a functional group containing a silicon atom is further introduced.

A silane group obtained by combining a silicon atom with a hydrocarbyloxy group and/or a hydroxy group can be listed as the functional group containing a silicon atom described above.

The above functional group for modification is present preferably at any of a polymerization initiating end, a side chain and a polymerization active end of the modified conjugate diene based polymer. In the present invention, it is preferably a polymer in which a protic amine group and/or an amine group protected by a releasable group and a silicon atom to which a hydrocarbyloxy group and/or a hydroxy group are bonded, particularly preferably, a silicon atom to which one or two hydrocarbyloxy groups and/or a hydroxy group are bonded are present preferably at a polymerization end, more preferably the same polymerization active end.

At least one selected from a primary amino group, a secondary amino group and salts thereof can be listed as the protic amino group described above.

On the other hand, the amino group protected by a releasable group includes, for example, a N,N-bis(trihydrocarbylsilyl)amino group and a N-bis(trihydrocarbylsilyl)imino group. A trialkylsilyl group in which a hydrocarbyl group is an alkyl group having 1 to 10 carbon atoms can be preferably listed, and a trimethylsilyl group can be particularly preferably listed.

A N,N-bis(trimethylsilyl)amino group can be listed as the example of the primary amino group (hereinafter referred to as the protected primary amino group) protected by a releasable group, and a N-(trimethylsilyl)imino group can be listed as the example of the secondary amino group protected by a releasable group. The above N-(trimethylsilyl)imino group-containing group may be any of a non-cyclic imine residue and a cyclic imine residue.

Among the amine-modified conjugate diene based polymers described above, the primary amine-modified conjugate diene based polymer modified by a primary amino group is suitably a primary amine-modified conjugate diene based polymer modified by a protected primary amino group, which is obtained by reacting an active end of a conjugate diene based polymer with a protected primary amine compound.

<Conjugate Diene Based Polymer>

The conjugate diene based polymer used for modification may be either a conjugate diene based compound homopolymer or a copolymer of a conjugate diene compound with an aromatic vinyl compound.

The conjugate diene compound described above includes, for example, 1,3-butadiene, isoprene, 1,3-pentadiene, 2,3-dimethyl-1,3-butadiene, 2-phenyl-1,3-butadiene, 1,3-hexadiene and the like. They may be used alone or in combination of two or more kinds thereof, and among them, 1,3-pentadiene is particularly preferred.

The aromatic vinyl compound used for copolymerization with the conjugate diene compound includes, for example, styrene, α-methylstyrene, 1-vinylnaphthalene, 3-vinyltoluene, ethylvinylbenzene, divinylbenzene, 4-cyclohexylstyrene, 2,4,6-trimethylstyrene and the like. They may be used alone or in combination of two or more kinds thereof, and among them, styrene is particularly preferred.

The conjugate diene based polymer described above is preferably polybutadiene or styrene-butadiene copolymers, and polybutadiene is particularly preferred.

In order to react an active end of the conjugate diene based polymer with protected primary amine to modify it, the above conjugate diene based polymer is preferably provided with a living property or a pseudo-living property in at least 10% of a polymer chain. Polymerization reaction providing the above living property includes reaction in which a conjugate diene compound alone or a conjugate diene compound and an aromatic vinyl compound are subjected to anionic polymerization in an organic solvent using an organic alkali metal compound as an initiator or reaction in which a conjugate diene compound alone or a conjugate diene compound and an aromatic vinyl compound are subjected to coordinate anionic polymerization in an organic solvent by a catalyst containing a lanthanum series rare earth element compound. The former is preferred since it can provide a polymer having a high content of a vinyl bond in a conjugate diene part as compared with that in the latter. The heat resistance can be improved by enhancing the vinyl bond amount.

The organic alkali metal compound used as the initiator for the anionic polymerization described above is preferably an organic lithium compound. The organic lithium compound shall not specifically be restricted, and hydrocarbyllithium and lithium amide compounds are preferably used. When hydrocarbyllithium of the former is used, a conjugate diene based polymer which has a hydrocarbyl group at a polymerization initiation end and in which the other end is a polymerization active site is obtained. Also, when the lithium amide compound of the latter is used, a conjugate diene based polymer which has a nitrogen-containing group at a polymerization initiation end and in which the other end is a polymerization active site is obtained.

The hydrocarbyllithium described above is preferably a product having a hydrocarbyl group having 2 to 20 carbon atoms, and it includes, for example, ethyllithium, n-propyllithium, isopropyllithium, n-butyllithium, sec-butyllithium, tert-octyllithium, n-decyllithium, phenyllithium, 2-naphthyllithium, 2-butylphenyllithium, 4-phenylbutyllithium, cyclohexyllithium, cyclopentyllithium and reaction products of diisopropenylbenzene and butyllithium. Among them, n-butyllithium is particularly suited.

On the other hand, the lithium amide compound includes, for example, lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methylpiperazine, lithium ethylpropylamide, lithium ethylbutylamide, lithium ethylbenzylamide, lithium methylphenethylamide and the like. Among them, cyclic lithium amide such as lithium hexamethyleneimide, lithium pyrrolidide, lithium piperidide, lithium heptamethyleneimide, lithium dodecamethyleneimide and the like are preferred from the viewpoints of an interaction effect to carbon black and a polymerization initiation ability, and lithium hexamethyleneimide and lithium pyrrolidide are particularly suited.

In general, compounds prepared in advance from secondary amines and lithium compounds can be used for the above lithium amide compounds, and they can be prepared as well in the polymerization system (in-Situ). Also, a use amount of the above polymerization initiator is selected preferably in a range of 0.2 to 20 millimole per 100 g of the monomer.

A method for producing the conjugate diene based polymer by the anionic polymerization using the organic lithium compounds described above as the polymerization initiator shall not specifically be restricted, and methods which have so far been publicly known can be used.

To be specific, the conjugate diene compound or the conjugate diene compound and the organic vinyl compound are subjected to anionic polymerization in the organic solvent which is inactive to the reaction, for example, a hydrocarbon based solvent such as aliphatic, alicyclic and aromatic hydrocarbon compounds using the lithium compounds described above as the polymerization initiator under the presence of a randomizer used if desired, whereby the targeted conjugate diene based polymer having an active end is obtained.

Further, when the organic lithium compounds is used as the polymerization initiator, not only the conjugate diene based polymer having an active end but also the copolymer of the conjugate diene compound and the organic vinyl compound which has an active end can efficiently be obtained as compared with a case where the catalyst containing the lanthanum based rear earth element compound described above is used.

The hydrocarbon base solvent described above is preferably hydrocarbons having 3 to 8 carbon atoms, and capable of being listed are, for example, propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and the like. They may be used alone or in a mixture of two or more kinds thereof.

A concentration of the monomer in the solvent is preferably 5 to 50% by mass, more preferably 10 to 30% by mass. When the conjugate diene compound and the aromatic vinyl compound are used to copolymerize them, a content of the organic vinyl compound in the charged monomer mixture falls preferably in a range of 55% by mass or less.

The randomizer used if desired is a compound having actions such as controlling of a microstructure of the conjugate diene based polymer, for example, an increase in a 1,2-bond of a butadiene part in a butadiene-styrene copolymer and a 3,4-bond in an isoprene polymer, controlling of a composition distribution of a monomer unit in a conjugate diene compound-aromatic vinyl compound copolymer, for example, randomization of a butadiene unit and a styrene unit in a butadiene-styrene copolymer. The above randomizer shall not specifically be restricted, and optional compounds suitably selected from publicly known compounds usually used as a randomizer can be used. To be specific, capable of being listed are ethers and tertiary amines such as dimethoxybenzene, tetrahydrofuran, dimethoxyethane, diethylene glycol dibutyl ether, diethylene glycol dimethyl ether, oxolanylpropane oligomers (particularly oligomers containing 2,2-bis (2-tetrahydrofuryl)-propane), triethylamine, pyridine, N-methylmorpholine, N,N,N',N'-tetramethylethylenediamine, 1,2-piperidinoethane and the like. Further, potassium salts such as potassium tert-amylate, potassium tert-butoxide and the like and sodium salts such as sodium tert-amylate and the like can be used as well.

The above randomizers may be used alone or in combination of two or more kinds thereof. A use amount thereof is selected preferably in a range of 0.01 to 1000 mole equivalent per mole of the lithium compound.

Temperature in the above polymerization reaction is selected in a range of preferably 0 to 150° C., more preferably 20 to 130° C. The polymerization reaction can be carried out under pressure generated, and usually, it is operated preferably at pressure which is sufficient for maintaining the monomer substantially in a liquid phase. That is, though depending the respective materials subjected to the polymerization, the polymerization medium used and the polymerization temperature, the higher pressure can be used if desired, and the above pressure can be obtained by a suitable method such as applying pressure to the reactor by gas which is inert to the polymerization reaction.

<Modifying Agent>

In the present invention, a tin atom can be introduced into an active end of the conjugate diene based polymer having an active end obtained in the manner described above by a tin compound such as tin tetrachloride, tributyltin chloride, dioctyltin dichloride, dibutyltin dichloride, triphenyltin chloride and the like as a modifying agent. A nitrogen atom can be introduced thereinto by isocyanate based compounds such as 2,4-tolylenediisocyanate, diisocyanatediphenylmethane and the like; aminobenzophenone compounds such as 4,4'-bis (diethylamino)-benzophenone, 4-(dimethylamino)benzophenone and the like, urea derivatives such as 1,3-dimethyl-2-imidazolidinone, 1,3-diethyl-2-imidazolidinone, 1,3-dimethyl-3,4,5,6-tetrahydropyrimiidine and the like, in addition thereto, nitrogen-containing compounds such as 4-dimethylaminobenzylideneaniline, dimethylimidazolidinone, N-methylpyrrolidone and the like. A silicon atom can be introduced thereinto by an end modifying agent such as alkoxysilane, aminoalkoxysilane and the like. To be specific, the epoxy group-containing alkoxysilane compound includes, for example, 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane and the like.

The primary amine-modified conjugate diene based polymers can be produced by reacting the above compounds with protected primary amine compounds as the particularly preferred modifying agent. The protected primary amine compounds described above are suitably alkoxysilane compounds having a protected primary amino group.

The alkoxysilane compounds having a protected primary amino group which are used as the above modifying agent include, for example, N,N-bis (trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis (trimethylsilyl) aminopropyltriethoxysilane, N,N-bis(trimethylsilyl) aminopropylmethyldiethoxysilane, N,N-bis(trimethylsilyl) aminoethyltrimethoxysilane, N,N-bis (trimethylsilyl) aminoethyltriethoxysilane, N,N-bis(trimethylsilyl) aminoethylmethyldimethoxysilane, N,N-bis (trimethylsilyl) aminoethylmethyldiethoxysilane and the like, and they are preferably N,N-bis(trimethylsilyl)aminopropylmethyldimethoxysilane, N,N-bis(trimethylsilyl)aminopropylmethyldiethoxysilane or 1-trimethylsilyl-2,2-dimethoxy-1-aza-2-silacyclopentane.

Further, the modifying agents include as well alkoxysilane compounds having a protected secondary amino group such as N-methyl-N-trimethylsilylaminopropyl(methyl)dimethoxysilane, N-methyl-N-trimethylsilylaminopropyl(methyl)diethoxysilane, N-trimethylsilyl(hexamethyleneimine-2-yl)propyl(methyl)dimethoxysilane, N-trimethylsilyl(hexamethyleneimine-2-yl)propyl(methyl)diethoxysilane, N-trimethylsilyl(pyrrolidine-2-yl)propyl(methyl)dimethoxysilane, N-trimethylsilyl(pyrrolidine-2-yl)propyl(methyl)diethoxysilane, N-trimethylsilyl(piperidine-2-yl)propyl(methyl)dimethoxysilane, N-trimethylsilyl(piperidine-2-yl)propyl(methyl)diethoxysilane, N-trimethylsilyl(imidazole-2-yl)propyl(methyl)dimethoxysilane, N-trimethylsilyl(imidazole-2-yl)propyl(methyl)diethoxysilane, N-trimethylsilyl(4,5-dihydroimidazole-5-yl)propyl(methyl)dimethoxysilane, N-trimethylsilyl(4,5-dihydroimidazole-5-yl)propyl(methyl)diethoxysilane and the like; alkoxysilane compounds having an imino group such as N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimthylaminobenzylidene)-3-(triethoxysilyl)-1-propaneamine, N-(cyclohexylidene)-3-(triethoxysilyl)-1-propaneamine and the like; alkoxysilane compounds having an amino group such as 3-dimethylaminopropyl(triethoxy)silane, 3 dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, 3-dibutylaminopropyl(triethoxy)silane and the like.

The above modifying agents may be used alone or in combination of two or more kinds thereof. Also, the above modifying agents may be partial condensation products.

In this connection, the partial condensation products mean the modifying agents in which a part (not all) of SiOR is converted into a SiOSi bond by condensation.

In modifying reaction carried out by the modifying agent described above, a use amount of the above modifying agent is preferably 0.5 to 200 mmol/kg·conjugate diene based polymer. The above use amount is more preferably 1 to 100 mmol/kg·conjugate diene based polymer, particularly preferably 2 to 50 mmol/kg·conjugate diene based polymer. In this regard, the conjugate diene based polymer means a mass of the polymer alone which does not contain additives such as an antioxidant and the like added in the production or after the production. Controlling a use amount of the modifying agent to the ranges described above makes a filler, particularly carbon black excellent in a dispersibility and allows the rapture resistant characteristic and the low heat generation property after vulcanization to be improved.

An adding method of the modifying agents described above shall not specifically be restricted and includes a method in which they are added in one lot, a method in which they are added in a divided lot, a method in which they are added continuously and the like, and the method in which they are added in one lot is preferred.

Also, the modifying agent can be bonded to any of a principal chain and a side chain of the polymer in addition to a polymerization initiating end and a polymerization finishing end thereof, and it is introduced preferably into the polymerization initiating end or the polymerization finishing end from the viewpoint that energy can be inhibited from disappearing from an end of the polymer to improve the low heat generation property.

<Condensation Accelerator>

In the present invention, a condensation accelerator is preferably used in order to accelerate condensation reaction in which the alkoxysilane compound having a protected primary amino group used as the modifying agent described above participates.

Capable of being used as the above condensation accelerator are compounds having a tertiary amino group or organic compounds having at least one element belonging to any of a 3rd group, a 4th group, a 5th group, a 12th group, a 13th group, a 14th group and a 15th group in the periodic table (long periodic table). Further, the condensation accelerator is preferably alkoxides, carboxylates or acetylacetonate complex salts containing at least one metal selected from the group consisting of titanium (Ti), zirconium (Zr), bismuth (Bi), aluminum (Al) and tin (Sn).

The condensation accelerator used above can be added before the modification reaction described above, but it is preferably added to the modification reaction system in the middle of the modification reaction and/or after finishing it. When it is added before the modification reaction, it is reacted directly with the active end, and the hydrocarbyloxy group having a protected primary amino group is not introduced into the active end in a certain case.

An addition timing of the condensation accelerator is usually after 5 minutes to 5 hours since initiating the modification reaction, preferably after 15 minutes to 1 hour since initiating the modification reaction.

Capable of being listed as the condensation accelerator are, to be specific, compounds containing titanium, such as tetramethoxytitanium, tetraethoxytitanium, tetra-n-propoxytitanium, tetraisopropoxytitanium, tetra-n-butoxytitanium, tetra-n-butoxytitanium oligomers, tetra-sec-butoxytitanium, tetra-tert-butoxytitanium, tetra(2-ethylhexyl)titanium, bis(octanedioleate)bis(2-ethylhexyl)titanium, tetra(octanedioleate)titanium, titanium lactate, titanium dipropoxybis(triethanolaminate), titanium dibutoxybis(triethanolaminate), titanium tributoxystearate, titanium tripropoxystearate, titanium ethylhexyldioleate, titanium tripropoxyacetylacetonate, titanium dipropoxybis(acetylacetonate), titanium tripropoxyethylacetoacetate, titanium propoxyacetylacetonatebis(ethylacetoacetate), titanium tributoxyacetylacetonate, titanium dibutoxybis(acetylacetonate), titanium tributoxyethylacetoacetate, titanium butoxyacetylacetonatebis(ethylacetoacetate), titanium tetrakis(acetylacetonate), titanium diacetylacetonatebis(ethylacetoacetate), bis(2-ethylhexanoate)titanium oxide, bis(laurate)titanium oxide, bis(naphthenate)titanium oxide, bis(stearate)titanium oxide, bis(oleate)titanium oxide, bis(linoleate)titanium oxide, tetrakis(2-ethylhexanoate)titanium, tetrakis(laurate)

titanium, tetrakis(naphthenate)titanium, tetrakis(stearate)titanium, tetrakis(oleate)titanium, tetrakis(linoleate)titanium and the like.

Further, capable of being listed as the condensation accelerator are, for example, tris(2-ethylhexanoate)bismuth, tris (laurate)bismuth, tris(naphthenate)bismuth, tris(stearate)bismuth, tris(oleate)bismuth, tris(linoleate)bismuth, tetraethoxyzirconium, tetra-n-propoxyzirconium, tetraisopropoxyzirconium, tetra-n-butoxyzirconium, tetra-sec-butoxyzirconium, tetra-tert-butoxyzirconium, tetra(2-ethylhexyl)zirconium, zirconium tributoxystearate, zirconium tributoxyacetylacetonate, zirconium dibutoxybis(acetylacetonate), zirconium tributoxyethylacetoacetate, zirconium butoxyacetylacetonatebis(ethylacetoacetate), zirconium tetrakis(acetylacetonate), zirconium diacetylacetonatebis(ethylacetoacetate), bis(2-ethylhexanoate)zirconium oxide, bis (laurate)zirconium oxide, bis(naphthenate)zirconium oxide, bis(stearate)zirconium oxide, bis(oleate)zirconium oxide, bis (linoleate)zirconium oxide, tetrakis(2-ethylhexanoate)zirconium, tetrakis(laurate)zirconium, tetrakis(naphthenate)zirconium, tetrakis(stearate)zirconium, tetrakis(oleate) zirconium, tetrakis(linoleate)zirconium and the like.

Further, capable of being listed are triethoxyaluminum, tri-n-propoxyaluminum, triisopropoxyaluminum, tri-n-butoxyaluminum, tri-sec-butoxyaluminum, tri-tert-butoxyaluminum, tri(2-ethylhexyl)aluminum, aluminum dibutoxystearate, aluminum dibutoxyacetylacetonate, aluminum butoxybis(acetylacetonate), aluminum dibutoxyethylacetoacetate, aluminum tris(acetylacetonate), aluminum tris (ethylacetoacetate), tris(2-ethylhexanoate)aluminum, tris (laurate)aluminum, tris(naphthenate)aluminum, tris (stearate)aluminum, tris(oleate)aluminum, tris(linoleate) aluminum and the like.

Among the condensation accelerators described above, the titanium compounds are preferred, and the alkoxides of titanium metal, the carboxylates of titanium metal or the acetylacetonate complex salts of titanium metal are particularly preferred.

A use amount of the above condensation accelerators is preferably 0.1 to 10, particularly preferably 0.5 to 5 in terms of a mole ratio of a mole number of the compounds described above to a whole mole number of the hydrocarbyloxy groups present in the reaction system. The condensation reaction is efficiently promoted by controlling a use amount of the condensation accelerators to the ranges described above.

The condensation reaction in the present invention goes on under the presence of the condensation accelerator described above and vapor or water. A case under the presence of vapor includes desolvent treatment carried out by steam stripping, and the condensation reaction goes on during steam stripping.

Also, the condensation reaction may be carried out in an aqueous solution, and the condensation reaction temperature is preferably 85 to 180° C., more preferably 100 to 170° C. and particularly preferably 110 to 150° C.

Controlling the temperature in the condensation reaction to the ranges described above makes it possible to allow the condensation reaction to be efficiently promoted and completed and makes it possible to inhibit a quality of the modified conjugate diene based polymer obtained from being reduced by aging reaction of the polymer due to a change thereof with the passage of time.

The condensation reaction time is usually 5 minutes to 10 hours, preferably 15 minutes to 5 hours. Controlling the condensation reaction time to the ranges described above makes it possible to complete smoothly the condensation reaction.

A pressure of the reaction system in the condensation reaction is usually 0.01 to 20 MPa, preferably 0.05 to 10 MPa.

A method in carrying out the condensation reaction in an aqueous solution shall not specifically be restricted, and a batch type reactor may be used or an equipment such as a multistage continuous type reactor and the like may be used to carry out the reaction in a continuous manner. Further, the above condensation reaction and desolvent may be carried out at the same time.

A primary amino group originating in the modifying agent in the modified conjugate diene based polymer of the present invention is formed, as described above, by carrying out deprotecting treatment. A suited specific example of deprotecting treatment other than desolvent treatment using water vapor such as the steam stripping described above shall be described below.

That is, a protective group on a primary amino group is converted into a free amino group by hydrolyzing it. This is subjected to desolvent treatment, whereby a modified conjugate diene based polymer having a primary amino group can be obtained. A protected amino group originating in the modifying agent can be subjected, if necessary, to deprotection treatment in any stage from a stage including the above condensation treatment to a dried polymer obtained by desolvent.

<Modified Conjugate Diene Based Polymer>

The modified conjugate diene based polymer obtained in the manner described above has a Mooney viscosity ($ML_{1+4}$, 100° C.) of preferably 10 to 150, more preferably 15 to 100. When the Mooney viscosity is less than 10, the rubber physical properties including the rupture resistant characteristic are not sufficiently obtained, and when it exceeds 150, the operability is inferior to make it difficult to mix the polymer with the blend agents.

Also, the non-vulcanized rubber composition according to the present invention which is blended with the modified conjugate diene based polymer described above has a Mooney viscosity ($ML_{1+4}$, 130° C.) of preferably 10 to 150, more preferably 30 to 100.

In the modified conjugate diene based polymer used for the rubber composition according to the present invention, a ratio (Mw/Mn) of a weight average molecular weight (Mw) to a number average molecular weight (Mn), that is, a molecular weight distribution (Mw/Mn) is preferably 1 to 3, more preferably 1.1 to 2.7.

Controlling a molecular weight distribution (Mw/Mn) of the modified conjugate diene based polymer within the ranges described above makes it easy to knead them without reducing an operability of the rubber composition when blending the modified conjugate diene based polymer with the rubber composition and makes it possible to enhance sufficiently the physical properties of the rubber composition.

Further, the modified conjugate diene based polymer used for the rubber composition according to the present invention has a number average molecular weight (Mn) of preferably 100,000 to 500,000, more preferably 150,000 to 300,000. Controlling a number average molecular weight of the modified conjugate diene based polymer within the ranges described above inhibits a reduction in an elastic modulus of the vulcanized matter and an elevation in the hysteresis loss to obtain the excellent rupture resistant characteristic and provides the rubber composition containing the above modified conjugate diene based polymer with an excellent kneading operability.

The modified conjugate diene based polymer used for the rubber composition according to the present invention may be used alone or in combination of two or more kinds thereof.

<Other Rubber Components>

A rubber component used in combination with the modified conjugate diene based polymer described above in the rubber component (A) includes natural rubber and other diene based synthetic rubbers. The other diene based synthetic rubbers include, for example, styrene-butadiene copolymers (SBR), polybutadiene (BR), polyisoprene (IR), styrene-isoprene copolymers (SIR), butyl rubber (IIR), halogenated butyl rubber, ethylene-propylene-diene ternary copolymers (EPDM) and mixtures thereof. A part or all of the other diene based synthetic rubbers is more preferably a diene based modified rubber which is provided with a branched structure by using a multifunctional modifying agent, for example, a modifying agent such as zinc tetrachloride.

Filler (B):

In the rubber composition according to the present invention, a filler as the component (B) is used preferably in a proportion of 50 parts by mass or less based on 100 parts by mass of the rubber component (A) described above.

If an amount of the filler exceeds 50 parts by mass, the effects of the satisfactory low heat generation, the low elasticity and the like are not exhibited, and a dynamic storage modulus (E') at a dynamic strain of 1% and 25° C. which shall be explained later is not 10 MPa or less in a certain case in the physical properties of the vulcanized rubber of the rubber composition obtained to provide the possibility that the ride comfort is deteriorated.

Further, if an amount of the filler is too large, a Σ value of a loss tangent tan δ at 28 to 150° C. which shall be explained later is not 5.0 or less in a certain case in the physical properties of the vulcanized rubber of the rubber composition obtained. Accordingly, an amount of the above filler is preferably 50 to 30 parts by mass, more preferably 45 to 40 parts by mass. If an amount of the filler is 30 parts by mass or less, the rubber is reduced in a braking strength and notably damaged in a run flat durability.

The above filler is at least one selected from carbon black, silica and the inorganic filler represented by Formula (I):

$$nM.xSiO_y.zH_2O \quad (I)$$

(wherein M is at least one selected from metal selected from aluminum, magnesium, titanium, calcium and zirconium, oxides or hydroxides of the above metals, hydrates thereof and carbonates of the above metals, and n, x, y and z are an integer of 1 to 5, an integer of 0 to 10, an integer of 2 to 5 and an integer of 0 to 10 respectively).

In this regard, in order to allow the vulcanized rubber physical property of the rubber composition obtained to satisfy the vulcanized rubber physical property described above, carbon blacks of various grades such as SAF, HAF, ISAF, FEF and GPF can be used alone or in a mixture. Among them, carbon blacks of an FEF grade and a GPF grade are preferred, and carbon black of an FEF grade is particularly preferred.

Silica shall not specifically be restricted, and wet silica, dry silica and colloidal silica are preferred. They can be used alone or in a mixture thereof.

Capable of being used as the inorganic filler represented by Formula (I) described above are, to be specific, alumina ($Al_2O_3$) such as Y-alumina, a-alumina and the like, alumina monohydrate ($Al_2O_3.H_2O$) such as boehmite, diaspore and the like, aluminum hydroxide ($Al(OH)_3$) such as gibbsite, bayerite and the like, aluminum carbonate ($Al_2(CO_3)_2$), magnesium hydroxide ($Mg(OH)_2$), magnesium oxide (MgO), magnesium carbonate ($MgCO_3$), talc ($3MgO.4SiO_2.H_2O$), attapulgite ($5MgO.8SiO_2.9H_2O$), titanium white ($TiO_2$), titanium black ($TiO_{2n-1}$), calcium oxide (CaO), calcium hydroxide ($Ca(OH)_2$), magnesium aluminum oxide ($MgO.Al_2O_3$), clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminum silicate ($Al_2SiO_5$, $Al_4.3SiO_4.5H_2O$ and the like), magnesium silicate ($Mg_2SiO_4$, $MgSiO_3$ and the like), calcium silicate ($Ca_2.SiO_4$ and the like), calcium aluminum silicate ($Al_2O_3.CaO.2SiO_2$ and the like), calcium magnesium silicate ($CaMgSiO_4$), calcium carbonate ($CaCO_3$), zirconium oxide ($ZrO_2$), zirconium hydroxide ($ZrO(OH)_2.nH_2O$), zirconium carbonate ($Zr(CO_3)_2$), crystalline aluminosilicates containing hydrogen, alkali metal or alkaline earth metal which corrects a charge, such as various zeolites.

The inorganic filler represented by Formula (I) is preferably a filler in which M is at least one selected from aluminum metal, oxide or hydroxide of aluminum and carbonate of aluminum.

Among them, carbon black and silica are preferred as the filler, and carbon black is particularly preferred.

Further, various chemicals usually used in the rubber industry, for example, a vulcanizing agent, a vulcanization accelerating agent, a process oil, an antioxidant, a scorch inhibitor, zinc oxide, stearic acid and the like can be added, if desired, to the rubber composition according to the present invention as long as the effects of the present invention are not damaged.

The vulcanizing agent described above includes sulfur and the like, and a use amount thereof is preferably 0.1 to 10.0 parts by mass, more preferably 1.0 to 5.0 parts by mass in terms of a sulfur content based on 100 parts by mass of the rubber component (A). If it is less than 0.1 part by mass, the vulcanized rubber is likely to be reduced in a rupture strength, an abrasion resistance and a low heat generating property, and if it exceeds 10.0 parts by mass, it causes loss of the rubber elasticity.

The vulcanization accelerating agent which can be used in the present invention shall not specifically be restricted, and capable of being listed are, for example, vulcanization accelerating agents of a thiazole base such as M (2-mercaptobenzothiazole), DM (dibenzothiazyl disulfide), CZ (N-cyclohexyl-2-benzothiazylsulfeneamide) and the like, a guanidine base such as DPG (diphenylguanidine) and the like and a thiuram base such as TOT (tetrakis(2-ethylhexyl)thiuram disulfide) and the like. A use amount thereof is preferably 0.1 to 5.0 parts by mass, more preferably 0.2 to 3.0 parts by mass based on 100 parts by mass of the rubber component (A).

Further, paraffin based compounds, naphthene based compounds, aromatic based compounds and the like can be listed as the process oil used as a softening agent which can be used in the rubber composition according to the present invention. The aromatic based compounds are used for applications in which great importance is placed on the tensile strength and the abrasion resistance, and the naphthene based or paraffin based compounds are used for applications in which great importance is placed on the hysteresis loss and the low temperature characteristic. A use amount thereof is preferably 0 to 100 parts by mass based on 100 parts by mass of the rubber component (A), and if it is 100 parts by mass or less, the vulcanized rubber can be inhibited from being deteriorated in a tensile strength and a low heat generation property (low fuel consumption).

Further, 3C (N-isopropyl-N'-phenyl-p-phenylenediamine), 6C (N-(1,3-dimethylbutyl)-N'-phenyl-p-phenylenediamine), AW (6-ethoxy-2,2,4-trimethyl-1,2-dihydroxyquinoline), high temperature condensation products of diphenylamine and acetone and the like can be listed as the antioxidant used in the rubber composition according to the present invention. A use amount thereof is preferably 0.1 to 5.0 parts by mass, more preferably 0.3 to 3.0 parts by mass based on 100 parts by mass of the rubber component (A).

Physical Properties of Vulcanized Rubber of Rubber Composition (a):

The rubber composition according to the present invention has to have a dynamic storage modulus (E') of 10 MPa or less at a dynamic strain of 1% and 25° C. in the physical properties of the vulcanized rubber. If the above dynamic storage modulus (E') at a dynamic strain of 1% and 25° C. exceeds 10 MPa, the tire in normal running is less liable to be bent, and the ride comfort is reduced. The dynamic storage modulus (E') is preferably 1 to 10 MPa, more preferably 3 to 10 MPa and particularly preferably 3 to 8 MPa.

The dynamic storage modulus (E') described above is a value measured by the following method.

<Measuring Method of Dynamic Storage Modulus (E')>

A sheet having a width of 5 mm and a length 40 mm is cut out from a slab sheet having a thickness of 2 mm which is obtained by vulcanizing a side inner layer rubber composition on the conditions of 160° C. and 12 minutes, and it is used as a sample. A dynamic storage modulus (E') of the above sample is measured on the conditions of a chuck-to-chuck distance of 10 mm, an initial strain of 200 μm, a dynamic strain of 1%, a frequency of 52 Hz and a measuring temperature of 25° C. by means of a spectrometer manufactured by Ueshima Seisakusho Co., Ltd.

Further, a $\Sigma$ value ($\Sigma$ tan $\delta$ (28 to 150° C.)) of the loss tangent tan $\delta$ at 28 to 150° C. in the physical properties of the vulcanized rubber described above has to be 5.0 or less. If a $\Sigma$ value of the above tan $\delta$ exceeds 5.0, the tire generates a large amount of heat in run flat running, and a run flat running durability of the tire is reduced. A value of $\Sigma$ tan $\delta$(28 to 150° C.) falls in a range of preferably 1.0 to 5.0, particularly preferably 2.0 to 4.0.

$\Sigma$ tan $\delta$ (28 to 150° C.) described above is a value measured by the following method.

<Measuring method of $\Sigma$ tan ($\Sigma$ tan $\delta$ (28 to 150° C.)>

Figure 3:
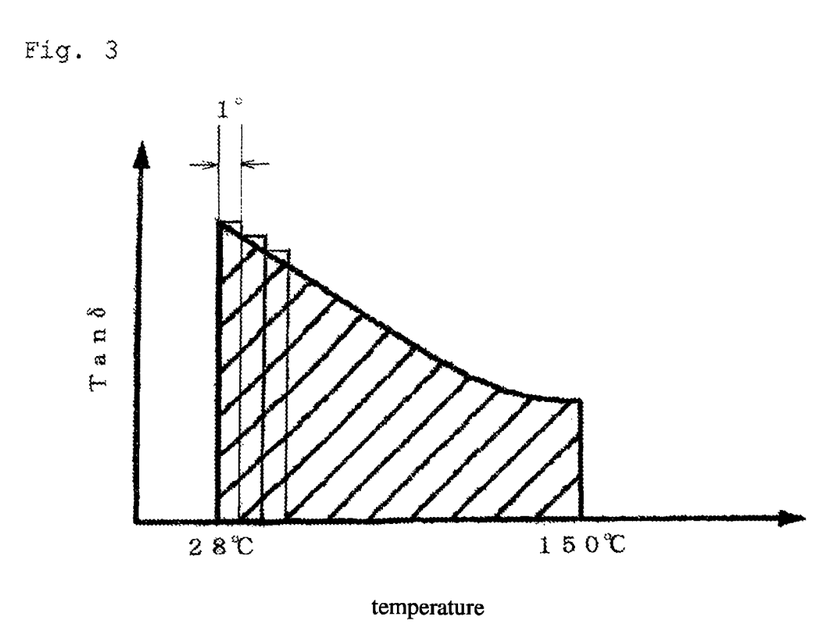
FIG. 3 is an explanatory drawing for determining Σ tan δ (28 to 150° C.) of the rubber composition in the vulcanized rubber physical properties.

A sheet having a width of 5 mm and a length 40 mm is cut out from a slab sheet having a thickness of 2 mm which is obtained by subjecting a rubber composition to vulcanization treatment on the conditions of 160° C. and 12 minutes, and it is used as a sample. A loss tangent tan $\delta$ of the above sample is measured in the temperature range of 28° C. to 150° C., as shown in FIG. 3, by every 1° on the conditions of a chuck-to-chuck distance of 10 mm, an initial strain of 200 μm, a dynamic strain of 1%, a frequency of 52 Hz and a measurement initiating temperature of 25 to 200° C. by means of the spectrometer manufactured by Ueshima Seisakusho Co., Ltd. The relation of the temperature and tan $\delta$ in terms of a summation thereof is shown by a graph to determine an area of a shaded part, and a value thereof is set to $\Sigma$ tan $\delta$ (28 to 150° C.)

Rubber Composition (b):

In the pneumatic tire of the present invention, an air permeability coefficient of the rubber composition (b) for an inner liner at 60° C. has to be $6.0 \times 10^{-10}$ cm$^3 \cdot$cm/cm$^2 \cdot$sec$\cdot$cm Hg or less, and a peeling stress between the side reinforcing layer (rubber composition (a)) and the inner liner each described above is preferably 5.5 kgf/inch or more.

The rubber composition (b) in which an air permeability coefficient at 60° C. is $6.0 \times 10^{-10}$ cm$^3 \cdot$cm/cm$^2 \cdot$sec$\cdot$cm Hg or less is applied to the inner liner described above, and therefore an air non-permeability thereof is maintained as compared with ever before. In this regard, if an air permeability coefficient of the rubber composition for an inner liner at 60° C. exceeds $6.0 \times 10^{-10}$ cm$^3 \cdot$cm/cm$^2 \cdot$sec$\cdot$cm Hg, an air non-permeability of the inner liner is reduced as compared with ever before, and the tire is deteriorated in an air holding property. Further, the physical properties of the respective members in the tire are changed to a large extent with the passage of time, and the belt is reduced in a durability. From the viewpoints of improving further more an air holding property of the tire and surely inhibiting the tire members from being deteriorated with the passage of time, an air permeability coefficient of the rubber composition for an inner liner at 60° C. is preferably $5.0 \times 10^{-10}$ cm$^3 \cdot$cm/cm$^2 \cdot$sec$\cdot$cm Hg or less, more preferably $2.5 \times 10^{-10}$ cm$^3 \cdot$cm/cm$^2 \cdot$sec$\cdot$cm Hg or less. A lower limit value of the air permeability coefficient shall not specifically be restricted, and it is about $50 \times 10^{-12}$ cm$^3 \cdot$cm/cm$^2 \cdot$sec$\cdot$cm Hg.

Further, a peeling stress between the side reinforcing layer and the inner liner each described above is preferably 5.5 kgf/inch or more. Peeling between the side reinforcing layer and the inner liner is sufficiently inhibited, and the tire is improved in a run flat durability. In this regard, from the viewpoints of surely inhibiting peeling between the side reinforcing layer and the inner liner and improving further more a run flat durability of the tire, a peeling stress between the side reinforcing layer and the inner liner each described above is more preferably 7.0 kgf/inch or more.

<Rubber Component>

The rubber component of the rubber composition (b) used for the inner liner includes natural rubber (NR) and synthetic rubbers such as butyl rubber (IIR), polybutadiene (BR), styrene-butadiene copolymers (SBR), acrylonitrile-butadiene copolymers (NBR), chloroprene rubber (CR) and the like. The butyl rubber described above may be halogenated. The above rubber components may be used alone or in a blend of two or more kinds thereof. In this connection, the rubber component of the rubber composition (b) for an inner liner described above contains preferably the butyl rubber. When the rubber component of the rubber composition (b) for an inner liner contains the butyl rubber, the above rubber composition can be improved in an air non-permeability. Further, from the viewpoint of surely improving an air non-permeability of the rubber composition (b) for an inner liner, a content of the butyl rubber in the rubber component of the above rubber composition is more preferably 80% by mass or more.

<Inorganic Filler>

The rubber composition (b) for an inner liner described above is blended preferably with 15 parts by mass or more of an inorganic filler having an aspect ratio of 5 to 30 based on 100 parts by mass of the rubber component. The rubber composition prepared by blending the rubber component with the flat inorganic filler having an aspect ratio of 5 to 30 has a high air non-permeability since the above flat inorganic filler prevents air from being permeated. If the inorganic filler has an aspect ratio of less than 5, the effect of enhancing an air non-permeability of the inner liner described above is small, and if it exceeds 30, the rubber composition is deteriorated in a processability. From the viewpoints of enhancing an air non-permeability of the inner liner and maintaining well a processability of the rubber composition, an aspect ratio of the inorganic filler is more preferably 5 to 20. In this connection, the aspect ratio described above shows a ratio of a major diameter of the flat inorganic filler to a thickness thereof. Further, if a blend amount of the flat inorganic filler is less than 15 parts by mass based on 100 parts by mass of the rubber component, the effect of enhancing an air non-permeability of the inner liner described above is small. From the viewpoint of surely improving an air non-permeability of the inner liner, a blend amount of the flat inorganic filler is more preferably 20 parts by mass or more based on 100 parts by mass of the rubber component.

The flat inorganic filler described above shall not specifically be restricted as long as it is a stratified or tabular mineral and has an aspect ratio of 5 to 30, and it may be either a natural product or a synthetic product. The above mineral includes, kaolin clay, mica, fledspar, a hydrate complex of silica and alumina, montmorillonite, saponite, hectorite, beidellite, stevensite, nontronite, vermiculite, halloysite and the like. Among them, kaolin clay and mica are preferred, and kaolin clay is particularly preferred. The above minerals may be used alone or in combination of two or more kinds thereof, and commercial products can suitably be used. The flat inorganic filler described above has preferably a particle diameter of usually 0.2 to 2 μm.

In addition to the rubber component and the flat inorganic filler each described above, blending agents usually used in the rubber industry, including a filler such as carbon black and the like, a vulcanizing agent, a vulcanization accelerating agent, an antioxidant, a scorch inhibitor, a softening agent, zinc oxide, stearic acid, a silane coupling agent and the like can suitably be selected and blended with the rubber composition (b) for an inner liner described above as long as the objects of the present invention are not damaged. Commercial products can suitably be used for the above blending agents.

<Vulcanization Speed Difference Δ>

A vulcanization speed difference Δ represented by the following Formula (II) between the rubber composition (a) for the side reinforcing rubber layer and the rubber composition (b) for the inner liner each described above is preferably 13.5 or less at a vulcanization temperature of 160° C.:

$$\Delta = |\{Tc(90)-Tc(10)\}_I - \{Tc(90)-Tc(10)\}_S|  \quad (II)$$

(wherein Tc(90) is 90% vulcanization time (minute) of a rubber composition; Tc(10) is 10% vulcanization time (minute) of a rubber composition; I is the rubber composition for the inner liner; and S is the rubber composition for the side reinforcing rubber layer).

If the vulcanization speed difference Δ between the rubber composition (a) for the side reinforcing rubber layer and the rubber composition (b) for the inner liner exceeds 13.5 at a vulcanization temperature of 160° C., a co-vulcanization property of the side reinforcing rubber layer and the inner liner is reduced, and as a result thereof, the side reinforcing rubber layer and the inner liner are readily peeled off in run flat running to reduce a run flat durability of the tire. In this regard, the vulcanization speed difference Δ described above is more preferably 13 or less at 160° C. from viewpoint of enhancing further more a run flat durability of the tire. The vulcanization speed can suitably be changed by controlling the kinds and the blending amounts of the vulcanizing agent, the vulcanization accelerating agent, the filler and the other blending agents.

Preparation of Rubber Composition and Production of Pneumatic Tire:

The rubber composition according to the present invention can be obtained by kneading the components according to the blend formulation described above by means of a kneading equipment such as a Banbury mixer, a roll, an internal mixer and the like, and after subjected to mold processing, it is vulcanized and used for the side reinforcing layer 8 and/or the bead filler 7 and the inner liner 6 in the pneumatic tire shown in FIG. 1.

The tire of the present invention is produced by a usual production method of run flat tires by using the rubber composition according to the present invention for the side reinforcing layer 8 and/or the bead filler 7 and the inner liner 6. That is, the rubber composition according to the present invention prepared by adding various chemicals in the manner described above is processed into the respective members in a non-vulcanization stage, and the members are stuck and molded on a tire molding equipment by a conventional method, whereby a crude tire is molded. The above crude tire is heated and pressurized in a vulcanizing equipment to obtain a tire.

The run flat tire of the present invention obtained in the manner described above is enhanced in a rolling resistance and a ride comfort in normal running without damaging a run flat durability.

EXAMPLES

Next, the present invention shall be explained in further details with reference to examples, but the present invention shall by no means be restricted by the examples shown below.

The respective characteristics were measured according to the following methods.

<<Physical Properties of Non-Modified or Modified Conjugate Diene Based Polymers>>

<Analytical Method of Micro Structure>

A content (%) of the vinyl bond was measured by an infrared method (Morello method).

<Measurements of Number Average Molecular Weight (Mn), Weight Average Molecular Weight (Mw) and Molecular Weight Distribution (Mw/Mn)>

Measured by means of GPC (HLC-8020, manufactured by Tosoh Corp.) using a refractometer as a detector and shown in terms of polystyrene using monodispersed polystyrene as a standard. The column is GMHXL (manufactured by Tosoh Corp.), and the eluant is tetrahydrofuran.

<Measurement of Primary Amino Group Content (mmol/kg)>

First, the polymer was dissolved in toluene, and then it was precipitated in a large amount of methanol to separate an amino group-containing compound which was not bonded to the polymer from the rubber, followed by drying it. The polymer subjected to the above treatment was used as a sample to quantitatively determine a whole amino group content thereof by "a whole amine value test method" described in JIS K7237. Subsequently, the polymer subjected to the treatment described above was used as a sample to quantitatively determine the contents of a secondary amino group and a tertiary amino group by "an acetylacetone blocked method". o-Nitrotoluene was used for the solvent dissolving the sample, and acetylacetone was added to carry out potentiometric titration by a perchloric acid solution. The contents of a secondary amino group and a tertiary amino group were deducted from the whole amino group content to determine a primary amino group content (mmol), and it was divided by a mass of the polymer used for the analysis to thereby determine a content (mmol/kg) of a primary amino group bonded to the polymer.

<<Evaluation of Non-Vulcanized Rubber>>

<Vulcanization Speed>

A vulcanization curve of the rubber composition was measured at 160° C. according to JIS K6300-2:2001 by means of Curelastometer manufactured by JSR Corporation. A maximum value (Fmax) and a minimum value (Fmin) of a torque in the vulcanization curve were measured, wherein time (minute) spent until a torque of {(Fmax−Fmin)×0.1+Fmin} was attained was set to 10% vulcanization time (Tc(10)), and time (minute) spent until a torque of {(Fmax−Fmin)×0.9+Fmin} was attained was set to 90% vulcanization time (Tc(90)); and a difference thereof was set to an index of the vulcanization speed.

<<Physical Properties of the Vulcanized Rubber of the Rubber Composition>>

The dynamic storage modulus (E') and a Σ value (Σ tan δ (28 to 150° C.)) of the loss tangent tan δ at 28 to 150° C. were measured according to the methods described in the present specification.

<Air Permeability>

The respective rubber compositions for an inner liner were vulcanized at 160° C. for 30 minutes to obtain samples, and the air permeability coefficients thereof at 60° C. were measured by means of an air permeability test equipment M-Cl (manufactured by Toyo Seiki Co., Ltd.

<<Evaluation of Pneumatic Tire>>

<Run Flat Durability>

The respective test tires (passenger car radial tires having a tire size of 215/45ZR17) were built in rims and charged with an inner pressure of 230 kPa, and after they were left standing in a room of 38° C. for 24 hours, a core of the valve was removed to allow the inner pressure to stay in an atmospheric pressure. They were subjected to a drum running test on the conditions of a load of 4.17 KN (425 kg), a speed of 89 km/hour and a room temperature of 38° C. The distances of the respective test tires running until troubles were caused were measured and shown by an index according to the following equation, wherein a running distance of a tire in Comparative Example 1 was set to 100. The larger the index is, the better the run flat durability is.

run flat durability (index)=(running distance of the test tire/running distance of the tire in Comparative Example 1)×100

<Ride Comfort>

The respective test tires were mounted in a passenger car to carry out a feeling test of the ride comfort by two professional drivers, and a score of 1 to 10 was given to determine an average value thereof. The larger the value is, the better the ride comfort is. An acceptance line of the ride comfort is 7 or more.

<Peeling Stress>

The side reinforcing rubber layer and the inner liner were stuck together and vulcanized to prepare a strip-shaped sample having a width of 20 mm. A peeling test was carried out in an interface between the side reinforcing rubber layer and the inner liner to measure a force required for peeling.

<Inner Pressure Holding Property>

The respective test tires were charged with a prescribed inner pressure of 100%, and an inner pressure retention factor thereof after 30 days was shown by an index to evaluate the inner pressure holding property, wherein that of the tire in Comparative Example 1 was set to 100. It is shown that the larger the value is, the more excellent the inner pressure holding rate is.

Production Example 1

Primary Amine-modified Polybutadiene (1) Production of Polybutadiene

A 5 L autoclave substituted with nitrogen was charged with 1.4 kg of cyclohexane, 250 g of 1,3-butadiene and 2,2-ditetrahydrofurylpropane (0.0285 mmol) in the form of a cyclohexane solution under nitrogen flow, and after 2.85 mmol of n-butyllithium (BuLi) was added thereto, polymerization was carried out for 4.5 hours in a warm water bath of 50° C. equipped with a stirring device. A reaction conversion rate of 1,3-butadiene was almost 100%. The above polymer solution was put in a methanol solution containing 1.3 g of 2,6-di-tert-butyl-p-cresol to terminate the polymerization, and then the solvent was removed by steam stripping. The resulting solid matter was dried on a roll of 110° C. to obtain polybutadiene. The polybutadiene thus obtained was used to measure a micro structure (vinyl bonding amount), a weight average molecular weight (Mw) and a molecular weight distribution (Mw/Mn). The results thereof showed a vinyl bonding amount of 14%, Mw of 150,000 and Mw/Mn of 1.1.

(2) Production of Primary Amine-Modified Polybutadiene

The polymer solution obtained in (1) described above was maintained at a temperature of 50° C. without deactivating the polymerization catalyst, and 1129 mg (3.364 mmol) of N,N-bis(trimethylsilyl)aminopropylmethyldiethoxysilane in which a primary amino group was protected was added thereto to carry out modification reaction for 15 minutes. Lastly, 2,6-di-tert-butyl-p-cresol was added to the polymer solution after the reaction. Then, desolvent and deprotection of the protected primary amino group were carried out by steam stripping, and the rubber was dried by a hot roll which was controlled at a temperature of 110° C. to obtain primary amine-modified polybutadiene. The primary amine-modified polybutadiene thus obtained was used to measure a micro structure (vinyl bonding amount), a weight average molecular weight (Mw), a molecular weight distribution (Mw/Mn) and a primary amino group content. The results thereof showed a vinyl bonding amount of 14%, Mw of 150,000, Mw/Mn of 1.2 and a primary amino group content of 4.0 mmol/kg.

Production Example 2

Production of Secondary Amine-Modified Polybutadiene

N-methyl-N-(trimethylsilyl)aminopropylmethyldiethoxysilane which was secondary amine was used as the modifying agent to carry out modification reaction based on (2) described above, and secondary amine-modified polybutadiene was obtained.

Production Example 3

Production of Tertiary Amine-Modified Polybutadiene

DMAPES: 3-dimethylaminopropyl(diethoxy)methylsilane was used as the modifying agent to carry out modification reaction based on (2) described above, and tertiary amine-modified polybutadiene was obtained.

Production Example 4

Production of Tin-Modified Polybutadiene

A pressure proof vessel of 800 ml which was dried and substituted with nitrogen was charged with a cyclohexane solution (16%) of butadiene so that the butadiene monomer was 50 g, and 0.44 mmol of ditetrahydrofurylpropane was added thereto. Further, 0.48 mmol of n-butyllithium (BuLi) was added thereto, and then polymerization was carried out at 50° C. for 1.5 hour. The polymerization conversion rate was almost 100%.

Tin tetrachloride 0.43 mmol was added to the above polymerization system, and then modification polymerization was further carried out at 50° C. for 30 minutes. Thereafter, 0.5 ml of an isopropanol 5 weight % solution of 2,6-di-t-butyl-p-cresol (BHT) was added to the polymerization system to terminate the polymerization, and the resulting solid matter was further dried by a conventional method to thereby obtain tin tetrachloride-modified polybutadiene. Mn thereof after the modification was 570,000.

Examples 1 to 12 and Comparative Examples 1 to 5

Seventeen kinds of rubber compositions having blend formulations shown in Tables 1-1 and 1-2 were prepared to determine the physical properties of vulcanized rubbers thereof respectively, that is, a dynamic storage modulus (E') and a Σ tan δ (28 to 150° C.)

Next, 17 kinds of the above rubber compositions were used to provide a side reinforcing layer 8 and a bead filler 7 each shown in FIG. 1 to produce radial tires for passenger cars having a tire size of 215/45ZR17 respectively by a conventional method, and the above tires were used to evaluate a run flat durability and a ride comfort. The results thereof are shown in Tables 1-1 and 1-2. A maximum thickness of the side reinforcing layer was determined as a reinforcing rubber gauge and shown in Tables 1-1 and 1-2.

TABLE 1-1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Blend composition (mass part) | Natural rubber[1] | 30 | 30 | 30 | 30 | 30 | 50 | 55 | 30 | 30 | 30 | 30 | 30 |
| | Non-modified polybutadiene[2] | — | — | — | — | — | — | — | — | — | — | — | — |
| | Primary amine-modified polybutadiene[3] | 70 | 70 | 70 | 70 | 70 | 50 | 45 | 70 | 70 | — | — | — |
| | Secondary amine-modified polybutadiene[4] | — | — | — | — | — | — | — | — | — | 70 | — | — |
| | Tertiary amine-modified polybutadiene[5] | — | — | — | — | — | — | — | — | — | — | 70 | — |
| | Tin-modified polybutadiene[6] | — | — | — | — | — | — | — | — | — | — | — | 70 |
| | Carbon black FEF[7] | 45 | 45 | — | 40 | 40 | 45 | 45 | 50 | 50 | 45 | 45 | 45 |
| | Carbon black GPF[8] | — | — | 55 | — | — | — | — | — | — | — | — | — |
| | Process oil[9] | 3 | 3 | 3 | 3 | 3 | 3 | 3 | 3 | 3 | 3 | 3 | 3 |
| | Zinc oxide | 5 | 5 | 5 | 5 | 5 | 5 | 5 | 5 | 5 | 5 | 5 | 5 |
| | Stearic acid | 1 | 1 | 1 | 1 | 1 | 1 | 1 | 1 | 1 | 1 | 1 | 1 |
| | Antioxidant 6C[10] | 1 | 1 | 1 | 1 | 1 | 1 | 1 | 1 | 1 | 1 | 1 | 1 |
| | Vulcanization accelerator CZ[11] | 3 | 3 | 3 | 3 | 3 | 3 | 3 | 3 | 3.9 | 3 | 3 | 3 |
| | Vulcanization accelerator TOT[12] | 1 | 1 | 1 | 1 | 1 | 1 | 1 | 1 | 1.3 | 1 | 1 | 1 |
| | Sulfur | 5 | 5 | 5 | 5 | 5 | 5 | 5 | 5 | 6.5 | 5 | 5 | 5 |
| Reinforced rubber gauge | | 6.3 | 5.7 | 5.7 | 6.3 | 5.7 | 5.7 | 5.7 | 6.3 | 5.7 | 6.3 | 6.3 | 6.3 |
| Evaluation | Storage modulus (E') in 1% elongation | 8 | 8 | 8.4 | 7.2 | 7.2 | 8.5 | 8.8 | 9 | 9.9 | 8.7 | 9 | 8.6 |
| | Σtan δ (28 to 150° C.) | 4.03 | 4.03 | 4.41 | 3.71 | 3.71 | 4.86 | 4.96 | 4.58 | 4.12 | 4.37 | 4.68 | 4.28 |
| | Run flat durability | 170 | 120 | 110 | 150 | 100 | 105 | 105 | 190 | 130 | 140 | 120 | 150 |
| | Ride comfort | 7.5 | 8 | 8 | 8 | 8.5 | 7.5 | 7.5 | 7 | 7.5 | 7.5 | 7 | 7.5 |

Remarks:
[1] Natural rubber: TSR20
[2] Non-modified polybutadiene: obtained in Production Example 1, (1) Production of polybutadiene
[3] Primary amine-modified polybutadiene: obtained in Production Example 1
[4] Secondary amine-modified polybutadiene: obtained in Production Example 2
[5] Tertiary amine-modified polybutadiene: obtained in Production Example 3
[6] Tin-modified polybutadiene: obtained in Production Example 4
[7] Carbon black: FEF (N550), "Asahi #60" manufactured by Asahi Carbon Co., Ltd.
[8] Carbon black: GPF (N660), "Asahi #55" manufactured by Asahi Carbon Co., Ltd.
[9] Process oil: aromatic oil, "Aromax #3" manufactured by Fuji Kosan Co., Ltd.
[10] Antioxidant 6C: N-(1,3-dimethyl)-N'-phenyl-p-phenylenediamine, "Nocrac 6C" manufactured by Ouchi Shinko Chemical Industrial Co., Ltd.
[11] Vulcanization accelerator CZ: N-cyclohexyl-2-benzothiazylsulfeneamide, "Nocceler CZ" manufactured by Ouchi Shinko Chemical Industrial Co., Ltd.
[12] Vulcanization accelerator TOT: tetrakis(2-ethylhexyl)-thiuram disulfide, "Nocceler TOT-N" manufactured by Ouchi Shinko Chemical Industrial Co., Ltd.

TABLE 1-2

| | | Comparative Example | | | | |
|---|---|---|---|---|---|---|
| | | 1 | 2 | 3 | 4 | 5 |
| Blend formulation (mass part) | Natural rubber[1] | 30 | 30 | 30 | 30 | 30 |
| | Non-modified polybutadiene[2] | 70 | 70 | — | — | — |
| | Primary amine-modified polybutadiene[3] | — | — | 70 | 70 | 70 |
| | Secondary amine-modified polybutadiene[4] | — | — | — | — | — |

TABLE 1-2-continued

|  |  | Comparative Example | | | | |
|---|---|---|---|---|---|---|
|  |  | 1 | 2 | 3 | 4 | 5 |
|  | Tertiary amine-modified polybutadiene[5] | — | — | — | — | — |
|  | Tin-modified polybutadiene[6] | — | — | — | — | — |
|  | Carbon black FEF[7] | 45 | 45 | 60 | 60 | 55 |
|  | Carbon black GPF[8] | — | — | — | — | — |
|  | Process oil[9] | 3 | 3 | 3 | 3 | 3 |
|  | Zinc oxide | 5 | 5 | 5 | 5 | 5 |
|  | Stearic acid | 1 | 1 | 1 | 1 | 1 |
|  | Antioxidant 6C[10] | 1 | 1 | 1 | 1 | 1 |
|  | Vulcanization accelerator CZ[11] | 3 | 3 | 3 | 3 | 3 |
|  | Vulcanization accelerator TOT[12] | 1 | 1 | 1 | 1 | 1 |
|  | Sulfur | 5 | 5 | 5 | 5 | 5 |
| Reinforced rubber gauge |  | 6.3 | 5.7 | 6.3 | 5 | 6.3 |
| Evaluation | Storage modulus (E') in 1% elongation | 9.5 | 9.5 | 12.5 | 12.5 | 10.8 |
|  | Σtan δ (28 to 150° C.) | 6.51 | 6.51 | 5.06 | 5.06 | 4.75 |
|  | Run flat durability | 100 | 60 | 200 | 100 | 120 |
|  | Ride comfort | 7 | 7.5 | 6 | 7 | 6.5 |

Rubber Compositions A to D for Side Reinforcing Rubber and Rubber Compositions E to I for Inner Liner:

Four kinds of rubber compositions were prepared according to blend formulations of rubber compositions A to D for side reinforcing rubber shown in Table 2. The vulcanization characteristics (TS=Tc(90)−Tc(10) minute) thereof were determined respectively, and the respective vulcanized rubber characteristics, that is, a dynamic storage modulus (E') and a Σ tan δ (28 to 150° C.) were determined. The evaluation results thereof are shown in Table 2.

TABLE 2

| Fundamental division | | Example | | Comparative Example | |
|---|---|---|---|---|---|
| Kind of rubber compositions for side reinforcing rubber |  | A | B | C | D |
| Blend formulation (mass part) | Natural rubber[1] | 30 | 30 | 30 | 30 |
|  | Non-modified polybutadiene[2] | — | — | 70 | 70 |
|  | Primary amine-modified polybutadiene[3] | 70 | — | — | — |
|  | Secondary amine-modified polybutadiene[4] | — | 70 | — | — |

TABLE 2-continued

| Fundamental division | | Example | | Comparative Example | |
|---|---|---|---|---|---|
|  | Carbon black[7] | 45 | 45 | 45 | 60 |
|  | Process oil[9] | 3 | 3 | 3 | 3 |
|  | Zinc oxide | 5 | 5 | 5 | 5 |
|  | Stearic acid | 1 | 1 | 1 | 1 |
|  | Antioxidant 6C[10] | 1 | 1 | 1 | 1 |
|  | Vulcanization accelerator CZ[11] | 3 | 3 | 3 | 3 |
|  | Vulcanization accelerator TOT[12] | 1 | 1 | 1 | 1 |
|  | Sulfur | 5 | 5 | 5 | 5 |
| Reinforced rubber gauge |  | 6.3 | 6.3 | 6.3 | 6.3 |
| Evaluation | Storage modulus (E') in 1% elongation | 8 | 8.7 | 9.5 | 10.7 |
|  | Σtan δ (28 to 150° C. | 4.03 | 4.37 | 6.51 | 7.32 |
|  | TS = Tc(90) − Tc(10) minute | 1.22 | 1.27 | 1.1 | 1.05 |

Next, 4 kinds of rubber compositions having blend formulations of rubber compositions E to I for an inner liner shown in Table 3 were prepared to determine a vulcanization characteristic (TI=Tc(90)−Tc(10) minute) and an air permeability respectively. The evaluation results thereof are shown in Table 3.

TABLE 3

| Fundamental division | | Example | Comparative Example | Example | | Comparative Example |
|---|---|---|---|---|---|---|
| Kind of rubber compositions for inner liner | | E | F | G | H | I |
| Blend formulation (mass part) | Natural rubber[1] | 20 | 40 | 10 | — | 25 |
|  | Bromobutyl rubber[13] | 80 | 60 | 90 | 100 | 75 |
|  | Carbon black[7] | 70 | 65 | 45 | 45 | 70 |
|  | Kaolin clay[15] | — | — | 30 | 20 | — |
|  | Spindle oil[16] | 10 | 10 | 5 | 5 | 10 |
|  | Stearic acid | 1 | 0.5 | 2 | 2 | 1 |
|  | Zinc oxide | 2 | 0.5 | 3 | 3 | 2 |
|  | Tackifier[17] | 2 | 1 | 2 | 2 | 2 |
|  | Vulcanization accelerator MBTS[18] | 1 | 1.1 | 1.5 | 1.5 | 1 |
|  | Sulfur | 0.5 | 0.5 | 0.5 | 0.5 | 0.5 |

TABLE 3-continued

| Fundamental division | | Example | Comparative Example | Example | | Comparative Example |
|---|---|---|---|---|---|---|
| Kind of rubber compositions for inner liner | | E | F | G | H | I |
| Evaluation | TI = Tc(90) – Tc(10) minute | 14.65 | 12.54 | 7.73 | 7.7 | 14.65 |
| | Air permeability ($cm^3 \cdot cm/cm^2 \cdot sec \cdot cm\,Hg$) | $5 \times 10^{-10}$ | $7.5 \times 10^{-10}$ | $2.5 \times 10^{-10}$ | $2.0 \times 10^{-10}$ | $6.2 \times 10^{-10}$ |

Remarks:
[13] Brominated butyl: manufactured by JSR Corporation
[7] Carbon black FEF (N550): "Asahi #60" manufactured by Asahi Carbon Co., Ltd.
[14] Kaolin clay: "POLYFIL DL", aspect ratio = 25, manufactured by J. M Huber Corporation
[15] Spindle oil: "Spindle Oil No. 2", manufactured by Idemitsu Kosan Co., Ltd.
[16] Tackifier: "Nisseki Neo Resin", manufactured by Nippon Petrochemicals Co., Ltd.
[17] Vulcanization accelerator MBTS: 2,2'-dibenzothiazyl disulfide, "Nocceler DM-P" manufactured by Ouchi Shinko Chemical Industrial Co., Ltd.

Examples 13 to 24 and Comparative Examples 6 to 14

Figure 2:
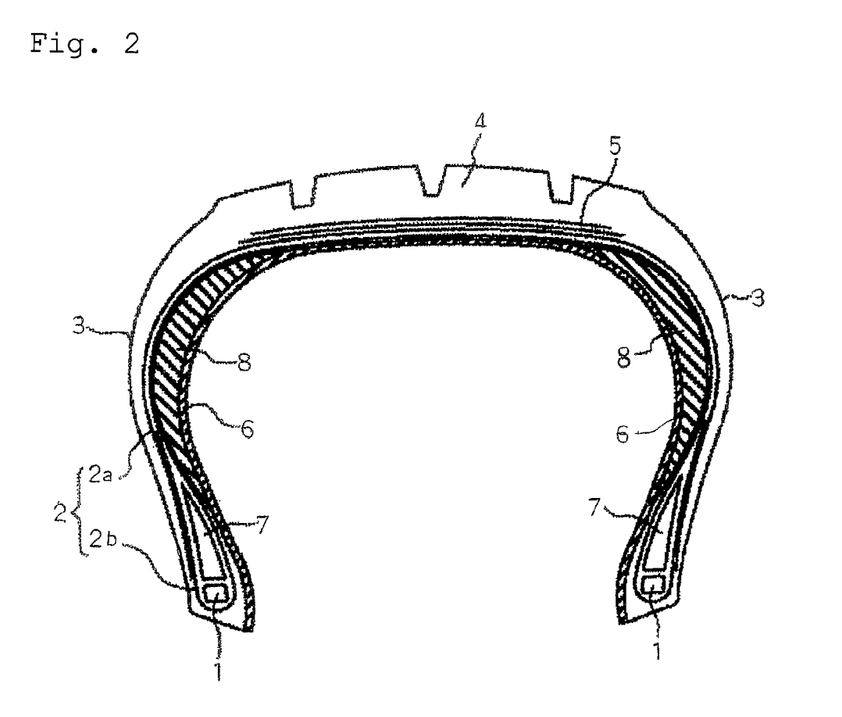
FIG. 2 is a schematic drawing showing a cross section in another embodiment of the pneumatic tire of the present invention.

According to blend formulations shown in Tables 4-1 and -2, 4 kinds of the rubber compositions for side reinforcing rubber were used to provide a side reinforcing rubber layer 7 and a bead filler 9 each shown in FIG. 2, and 5 kinds of the rubbers were used to provide an inner liner 6 in which an inner liner gauge was changed, whereby radial tires for passenger cars having a tire size of 215/45ZR17 were produced respectively by a conventional method.

Twenty one kinds of the tires thus obtained were used to evaluate an inner pressure holding property, a vulcanization speed difference (TI–TS), a peeling stress, a ride comfort and a run flat durability. The evaluation results thereof are shown in Table 4-1 and Table 4-2.

It can be found from the results shown in Table 1 that the pneumatic tires of the present invention prepared by using the rubber compositions according to the present invention for a side reinforcing layer and a bead filler can be improved in a rolling resistance and a ride comfort in normal running without damaging a run flat durability.

INDUSTRIAL APPLICABILITY

In the pneumatic tire of the present invention, a rubber composition which has an elastic modulus of a certain value or more in 100% elongation and a Σ value of a certain value or less in a loss tangent tan δ at 28 to 150° C. in the physical properties of the vulcanized rubber and which contains a small amount of carbon black is used particularly for a side reinforcing layer and/or a bead filler, whereby capable of being provided is the pneumatic tire which is improved in a

TABLE 4-1

| | Example | | | Comparative Example | | | | Example | |
|---|---|---|---|---|---|---|---|---|---|
| | 13 | 14 | 15 | 6 | 7 | 8 | 9 | 16 | 17 |
| Rubber composition for side reinforcing | A | A | A | C | C | C | C | A | B |
| Rubber composition for inner liner | E | G | H | E | F | G | H | G | G |
| Inner liner gauge mm | 1.5 | 1.5 | 1.5 | 1.5 | 1.5 | 1.5 | 1.5 | 1.0 | 1.0 |
| Inner pressure holding property INDEX | 100 | 186 | 245 | 100 | 67 | 190 | 239 | 126 | 122 |
| Vulcanization speed difference (TI – TS) | 13.43 | 6.15 | 6.48 | 13.55 | 11.44 | 6.27 | 6.60 | 6.15 | 6.10 |
| Peeling stress kgf/inch | 5.2 | 8.9 | 8.0 | 3.3 | 6.2 | 8.7 | 8.2 | 8.8 | 9 |
| Ride comfort | 7.5 | 7.5 | 7.0 | 6.5 | 6.5 | 6.5 | 6.5 | 7.5 | 7.5 |
| Run flat durability INDEX | 110 | 158 | 149 | 69 | 83 | 103 | 100 | 178 | 148 |

TABLE 4-2

| | Comparative Example | | | Example | | | | | | Comparative Example | | Example |
|---|---|---|---|---|---|---|---|---|---|---|---|---|
| | 10 | 11 | 12 | 18 | 19 | 20 | 21 | 22 | 23 | 13 | 14 | 24 |
| Rubber composition for side reinforcing | C | B | C | A | A | A | B | B | B | D | D | A |
| Rubber composition for inner liner | G | F | F | H | H | G | H | H | G | E | E | I |
| Inner liner gauge mm | 1.0 | 1.0 | 1.0 | 0.8 | 0.6 | 0.8 | 0.8 | 0.6 | 0.8 | 1.5 | 0.8 | 1.5 |
| Inner pressure holding property INDEX | 121 | 45 | 45 | 131 | 100 | 101 | 130 | 101 | 102 | 130 | 78 | 98 |
| Vulcanization speed difference (TI – TS) | 6.27 | 11.28 | 11.49 | 6.48 | 6.48 | 6.15 | 6.43 | 6.43 | 6.1 | 13.6 | 13.6 | 13.5 |
| Peeling stress kgf/inch | 8.6 | 6.6 | 6.4 | 8.2 | 8.3 | 8.5 | 8.4 | 8.5 | 9.1 | 3.1 | 3.1 | 5.6 |
| Ride comfort | 6.5 | 7.0 | 6.5 | 7.5 | 7.5 | 7.5 | 7.5 | 7.5 | 7.5 | 5 | 5 | 7.5 |
| Run flat durability INDEX | 104 | 103 | 104 | 180 | 185 | 182 | 150 | 157 | 156 | 115 | 128 | 112 | rolling resistance and a ride comfort in normal running without damaging a run flat durability and in which a side reinforcing rubber layer is inhibited from being peeled off from an inner liner while maintaining an air non-permeability of the inner liner to improve a run flat durability.

What is claimed is:

1. A pneumatic tire provided with a bead core, a carcass layer, a tread rubber layer, an inner liner, a side reinforcing layer and a bead filler, wherein the side reinforcing layer and/or the bead filler comprise a rubber composition (a) which contains (A) a rubber component and (B) a filler and which has a dynamic storage modulus (E') of 10 MPa or less at a dynamic strain of 1% and 25° C. and a Σ value of 5.0 or less in a loss tangent tan δ at 28 to 150° C. in the physical properties of the vulcanized rubber, wherein the rubber component (A) contains an amine-modified conjugate diene based polymer, filler (B) is carbon black, and the amount of filler (B) is 50 parts by mass or less based upon 100 parts by mass of rubber component (A).

2. The pneumatic tire according to claim 1, wherein the carbon black is at least one selected from the group consisting of an FEF grade, a GPF grade, an HAF grade, an ISAF grade and an SAF grade.

3. The pneumatic tire according to claim 2, wherein the carbon black is the FEF grade.

4. The pneumatic tire according to claim 1, wherein the amine-modified conjugate diene based polymer is a protic amine-modified conjugate diene based polymer.

5. The pneumatic tire according to claim 1, wherein the amine-modified conjugate diene based polymer is a primary amine-modified conjugate diene based polymer.

6. The pneumatic tire according to claim 5, wherein the primary amine-modified conjugate diene based polymer is a polymer obtained by reacting an active end of a conjugate diene based polymer with a protected primary amine compound.

7. The pneumatic tire according to claim 6, wherein the conjugate diene based polymer is a polymer obtained by subjecting a conjugate diene compound alone or a conjugate diene compound and an aromatic vinyl compound to anionic polymerization in an organic solvent using an organic alkali metal compound as an initiator.

8. The pneumatic tire according to claim 7, wherein the conjugate diene based polymer is polybutadiene.

9. The pneumatic tire according to claim 6, wherein the protected primary amine compound is one or more selected from the group consisting of N,N-bis (trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis (trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane and N,N-bis(trimethylsilyl)aminoethylmethyldiethoxysilane.

10. The pneumatic tire according to claim 9, wherein the protected primary amine compound is one or more selected from the group consisting of N,N-bis(trimethylsilyl)aminopropylmethyldimethoxysilane, N,N-bis(trimethylsilyl)aminopropylmethyldiethoxysilane and 1-trimethylsilyl-2,2-dimethoxy-1-aza-2-silacyclopentane.

11. The pneumatic tire according to claim 1, wherein the side reinforcing layer comprises the rubber composition (a).

12. The pneumatic tire according to claim 1, wherein the bead filler comprises the rubber composition (a).

13. The pneumatic tire according to claim 1, wherein the side reinforcing layer and the bead filler comprise the rubber composition (a).

* * * * *